United States Patent
Fant, IV et al.

(10) Patent No.: US 10,083,030 B1
(45) Date of Patent: Sep. 25, 2018

(54) ASYNCHRONOUS DEPENDENCY RESOLUTION

(71) Applicant: AMAZON TECHNOLOGIES, INC., Seattle, WA (US)

(72) Inventors: Joseph Carl Fant, IV, Bothell, WA (US); Edwin Voskamp, Seattle, WA (US); Stephen Peter Wakefield, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/587,144

(22) Filed: May 4, 2017

(51) Int. Cl.
*G06F 9/44* (2018.01)
*G06F 8/71* (2018.01)
*G06F 8/41* (2018.01)

(52) U.S. Cl.
CPC ............... *G06F 8/71* (2013.01); *G06F 8/433* (2013.01)

(58) Field of Classification Search
CPC ........................................ G06F 9/44

USPC ................................. 717/120–123, 175–176
See application file for complete search history.

(56) References Cited

U.S. PATENT DOCUMENTS

| | | | |
|---|---|---|---|
| 9,058,571 B2 * | 6/2015 | Guizar ................... | G06Q 10/06 |
| 2008/0201705 A1 * | 8/2008 | Wookey .................. | G06F 8/658 |
| | | | 717/175 |
| 2018/0012256 A1 * | 1/2018 | Napchi .............. | G06Q 30/0277 |

* cited by examiner

Primary Examiner — Jae Jeon
(74) Attorney, Agent, or Firm — Lowenstein Sandler LLP (57) ABSTRACT

An asynchronous dependency resolution system receives a request to store a first application component in an application repository, stores a first dependency map for the first application component in a dependency repository, and generates a first executable bundle for the first application component. The asynchronous dependency resolution system determines that the dependency repository comprises a first association between the first application component and a second application component, where the first application component is a dependency of a second application component, obtains source code for the second application component, and generates a second executable bundle for the second application component using the source code for the first and second application components.

12 Claims, 8 Drawing Sheets

ASYNCHRONOUS DEPENDENCY RESOLUTION

BACKGROUND

Web applications are often developed using application components that may be shared across multiple web application deployments. Some application components may be consumers of subordinate components, incorporating the features of the subordinate components. These subordinate components are typically referred to as "dependencies". Dependency resolution is a process of managing dependency relationships between multiple application components across an application deployment framework. Conventionally, dependency relationships are resolved when an application component is committed to the system (e.g. when the component is staged for deployment). In such cases, consumer components may not be timely notified that dependencies have been modified. Additionally, deployment of consumer components that share similar dependencies can lead to duplication of code. Embodiments discussed herein provide technical solutions to problems introduced by these types of application deployments.

BRIEF DESCRIPTION OF THE DRAWINGS

The embodiments described herein will be understood more fully from the detailed description given below and from the accompanying drawings. The drawings should not be taken to limit the application to the specific embodiments, but are for explanation and understanding only.

DETAILED DESCRIPTION

Embodiments described herein relate to providing a platform for asynchronous dependency resolution for application components during storage and/or deployment. In one embodiment, an asynchronous dependency resolver can traverse dependency mapping information for an application component to initiate redeployment of consumer components in near real time. In one embodiment, when updates to one application component are committed, the asynchronous dependency resolver can identify components for which the rebuilt component is a dependency and trigger the process of rebuilding those consumer applications with the updated dependency application component. Thus, the rebuilding of consumer applications may be conducted asynchronous to the deployment of the dependency component.

Conventional dependency resolution can sometimes involve the deployment of duplicate application code. When multiple consumer application components combined into a single application deployment, any common dependencies across the consumer components in the deployment are typically generated with dedicated versions of the dependency components. This can be particularly inefficient when deploying applications to web browsers, leading to increases in memory requirements for the application as well as increases in network traffic for the data transfer of the deployment. In one embodiment, the asynchronous dependency resolver of the present disclosure incorporates de-duplication processing to identify common dependencies across a deployment so that a single copy of a common dependency component may be utilized across multiple consumers in a deployment. Thus, in one embodiment, the size of executable bundles for deployments may be dramatically reduced, thereby reducing memory resources necessary for execution as well as network resources necessary for deployment.

Conventional dependency resolution may additionally lead to application failures when dependency components are modified. If a consumer application is modified, a newly modified dependency component may be unintentionally incorporated into the consumer application, which can lead to application failures. In one embodiment, the asynchronous dependency resolver of the present disclosure incorporates version tracking with dependency resolution to manage the requirements of consumer applications so that asynchronous redeployment triggered by modifications to a dependency component may be controlled.

In one embodiment, the asynchronous dependency resolver can provide dependency resolution in real time when web components are dynamically added to web pages. In conventional systems, web components that share dependencies are typically generated in advance of deployment. Thus, user experience is impacted since the lead time for adding components to a web page is dramatically increased. In one embodiment, the asynchronous dependency resolver of the present disclosure utilizes the combined dependency resolution, de-duplication, and version tracking features noted above to generate executable bundles for web components as they are added to dynamic web pages. Thus, in one embodiment, the resulting web components are optimized by the de-duplication and version tracking. Additionally, in one embodiment, since executable bundles may be generated when the components are selected for deployment to the web page, system flexibility is dramatically improved, which can provide an enhanced user experience.

Figure 1:
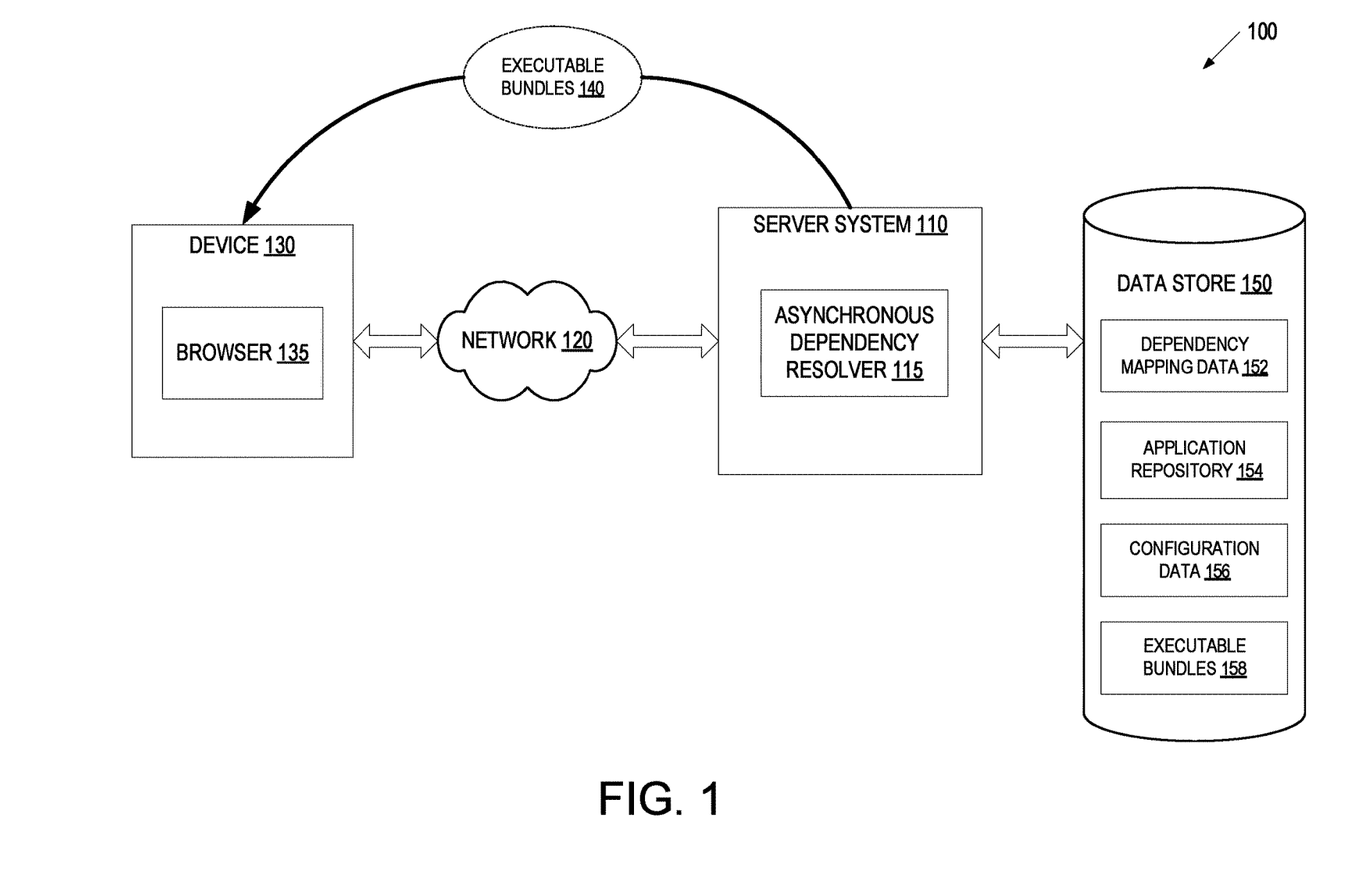
FIG. 1 is a block diagram of an example network architecture including an asynchronous dependency resolver, in accordance with one embodiment.

FIG. 1 is a block diagram of an example network architecture 100 in which embodiments described herein may operate. In one embodiment, the network architecture 100 may include server system 110 and device 130 capable of communicating with server system 110 via a network 120. In one embodiment, network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. In one embodiment, the network 120 may have any suitable communication range associated therewith and may include, for example, public networks (e.g., the Internet), metropolitan area networks (MANs), wide area networks (WANs), local area networks (LANs), or personal area networks (PANs). In one embodiment, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In one embodiment, device 130 may include any type of mobile computing device (e.g., that has a finite power source) or traditionally non-portable computing device. In one embodiment, device 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. In one embodiment, device 130 may also be a traditionally non-portable computing device such as a desktop computer, a server computer, or the like. In one embodiment, device 130 may be configured with functionality to enable execution of an application to interact with an asynchronous dependency resolver system, such as that provided by contact asynchronous dependency resolver 115 of server system 110.

In one embodiment, device 130 may include access to an application development platform that can provide the ability to update and store application components (e.g., web application widgets, standalone software applications, etc.) within server system 110. In one embodiment, asynchronous dependency resolver 115 may be invoked to resolve dependencies for new and/or updated application components provided by device 130. In one embodiment, device 130 may include browser 135 that interacts with asynchronous dependency resolver 115. In one embodiment, browser 135 may provide the capability to add application components (e.g., web application widgets) to a browser page. In one embodiment, browser 135 may also interact with asynchronous dependency resolver 115 to resolve dependencies among the application components added to the web page.

Communication between the server system 120 and the device 130 may be enabled via any communication infrastructure, such as public and private networks. In one embodiment, an example of such an infrastructure includes a combination of a wide area network (WAN) and wireless infrastructure, which allows a user to use device 130 to interact with contact run-time engine 115 without being tethered to the server system 110 via hardwired links. In one embodiment, the wireless infrastructure may be provided by one or multiple wireless communications systems. In one embodiment, the wireless communication systems may be a Wi-Fi access point connected with the network 120. In one embodiment, the wireless communication systems may be a wireless carrier system that can be implemented using various data processing equipment, communication towers, etc. In one embodiment, the wireless carrier system may rely on satellite technology to exchange information with the device 130.

In one embodiment, server system 110 may be set up by an entity such as a company or a public sector organization to provide one or more services (such as various types of cloud-based computing or storage) accessible via the Internet and/or other networks to device 130. In one embodiment, server system 110 may include numerous data centers hosting various resource pools, such as collections of physical and/or virtualized computer servers, storage devices, networking equipment and the like, needed to implement and distribute the infrastructure and services offered by the server system 110, including to provide multi- and single-tenant services.

In one embodiment, server system 110 may implement an asynchronous dependency resolver 115 and associated services, provide other computing resources or services, such as a virtual compute service and storage services, such as object storage services, block-based storage services, data warehouse storage service, archive storage service, data store 150, and/or any other type of network based services (which may include various other types of storage, processing, analysis, communication, event handling, visualization, and security services, such as a code execution service that executes code without client management of the execution resources and environment). In one embodiment, device 130 may access these various services offered by server system 110 via network 120, for example through an application programming interface (API) or a command line interface (CLI). Likewise network-based services may themselves communicate and/or make use of one another to provide different services.

As noted above, in one embodiment, server system 110 may include an asynchronous dependency resolver 115 which can receive requests from device 130 associated with the management of application components (e.g., for storage, deployment, execution, etc.). In one embodiment, an application component may be made up of application source code to generate an executable bundle that executes within a web browser (e.g., web component, widget, custom elements, etc.). In one embodiment, an application component may be made up of application source code to generate an executable bundle that executes as a standalone application outside of a web browser. In one embodiment, application component may be made up of one or more elements including JavaScript, cascading style sheets (CSS), hypertext markup language (HTML), or any similar markup language or application development source code.

In one embodiment, an application component may be developed to provide a particular discrete function. In one embodiment, one application component may incorporate another application component to perform its intended function. In one embodiment, this nested relationship between application components can be managed by tracking the dependencies of different components. For example, an application component that produces a form for a user to fill out via a browser window may incorporate another application component that produces a button object within the form. Since the form component depends on the button component, the button component is referred to as a "dependency" of the form component. In one embodiment, dependency relationships for components may be received by asynchronous dependency resolver 115 during the development stage of an application component and combined with the dependency relationships for other components to generate a dependency map for interrelated application components.

In one embodiment, asynchronous dependency resolver 115 may facilitate the storing and/or deployment of application components by utilizing stored dependency relationships. In one embodiment, asynchronous dependency resolver 115 can resolve any dependencies for related application components in real-time and imitate asynchronous redeployment of the related application components based on dependency information. In one embodiment, asynchronous dependency resolver 115 can perform dependency resolution upon receiving updated source code for a particular application component, triggering the redeployment of other dependent application components (e.g., consumers of the modified application component) to incorporate the updated component.

Notably, in one embodiment, asynchronous dependency resolver 115 may incorporate version control tracking in conjunction with dependency mapping information. Thus, different application components that have the same dependency can be configured to be deployed with different versions of the dependency component. In one embodiment, asynchronous dependency resolver 115 can use the dependency mapping information to eliminate duplication of the dependency component code when multiple application components that share a common dependency are combined together into a single executable bundle. Thus, the resource requirements of the resulting executable bundle may be substantially reduced.

In one embodiment, asynchronous dependency resolver 115 may also perform the above noted dependency resolution functions during the process of dynamically incorporating application components into a web page for execution within a browser. Upon receiving a request to add multiple application components to a web page, asynchronous dependency resolver 115 can dynamically resolve dependencies for the application components and generate a unique executable bundle for that web page. In one embodiment, asynchronous dependency resolver 115 may utilize the version tracking and de-duplication process noted above to dynamically create an executable bundle for the web page that reduces the resources required by the browser.

In one embodiment, server system 110 may provide asynchronous dependency resolver 115 with access to data store 150 that stores dependency mapping data 152, application repository 154, configuration data 156, and executable bundles 158. In one embodiment, dependency mapping data 152 may include a data structure that stores dependency mapping relationships for application components received by asynchronous dependency resolver 115. In one embodiment, dependency mapping data 152 may be stored as a database, a list, a tree structure, a graph, or in any similar manner. In one embodiment, when asynchronous dependency resolver 115 receives a new or updated application component for storage in data store 150, the dependency mapping information for that application component may also be received and stored in dependency mapping data 152.

In one embodiment, application repository 154 may be a data structure for storing the source code elements of a new or updated application component. Application repository 154 may be structured as a database, as a component of a source code management tracking system, or the like. In one embodiment, application repository 154 additionally stores version tracking information related to updates to application components to facilitate deployment of multiple versions of a particular application component. In one embodiment, configuration data 156 may be a data structure that maintains version tracking requirements for application component dependencies. Thus, when application components share a common dependency component, but each relies on a different version of the dependency component, configuration data 156 may be used to store the version requirements for each application component to facilitate dependency resolution. In one embodiment, configuration data 156 may be stored as a sub component of dependency mapping data 152.

In one embodiment, executable bundles 158 may be a data structure that stores executable bundles for application components that are ready for deployment. In one embodiment, when a request is received to add an application component to the application repository 154, asynchronous dependency resolver 115 may initiate a deployment process that builds an executable bundle for the application components (and its incorporated dependency components) and store it in executable bundles 158 for deployment to consumers of that application component.

In one embodiment, asynchronous dependency resolver 115 may receive a request from device 130 to store an application component in application repository 154. In one embodiment, the request may include source code for the application component, a version number for the application component and a dependency map with dependency relationships information for the application component. In one embodiment, asynchronous dependency resolver 115 may then store the information received in the request in data store 150, and generate an executable bundle for the application component, incorporating any dependency components referenced in the dependency map into the executable bundle for that application component.

In one embodiment, asynchronous dependency resolver 115 may then use the stored dependency mapping data 152 to initiate redeployment of any other application components that are dependent on (consumers of) the newly updated application component. In other words, asynchronous dependency resolver 115 identifies any application components for which the newly updated application component is a dependency. In one embodiment, asynchronous dependency resolver 115 may then initiate deployment for those application components, generating corresponding executable bundles for each consumer application component.

In one embodiment, asynchronous dependency resolver 115 may receive a request from browser 135 of device 130 to add multiple application components to a web page, where the application components are elements of the web page. In one embodiment, asynchronous dependency resolver 115 may obtain dependency maps with the dependency relationships for the application components and generate an intersection between the maps to identify any common dependencies stored in the dependency maps. In one embodiment, asynchronous dependency resolver 115 may then use the intersection to identify any other application components that are common dependencies of the requested application components and generate an executable bundle 140 for the web page. In one embodiment, executable bundles 140 may include the combined application components in a bundle that may be executed by browser 130 when the web page is loaded. Asynchronous dependency resolver 115 is described in further detail below with respect FIG. 2.

Figure 2:
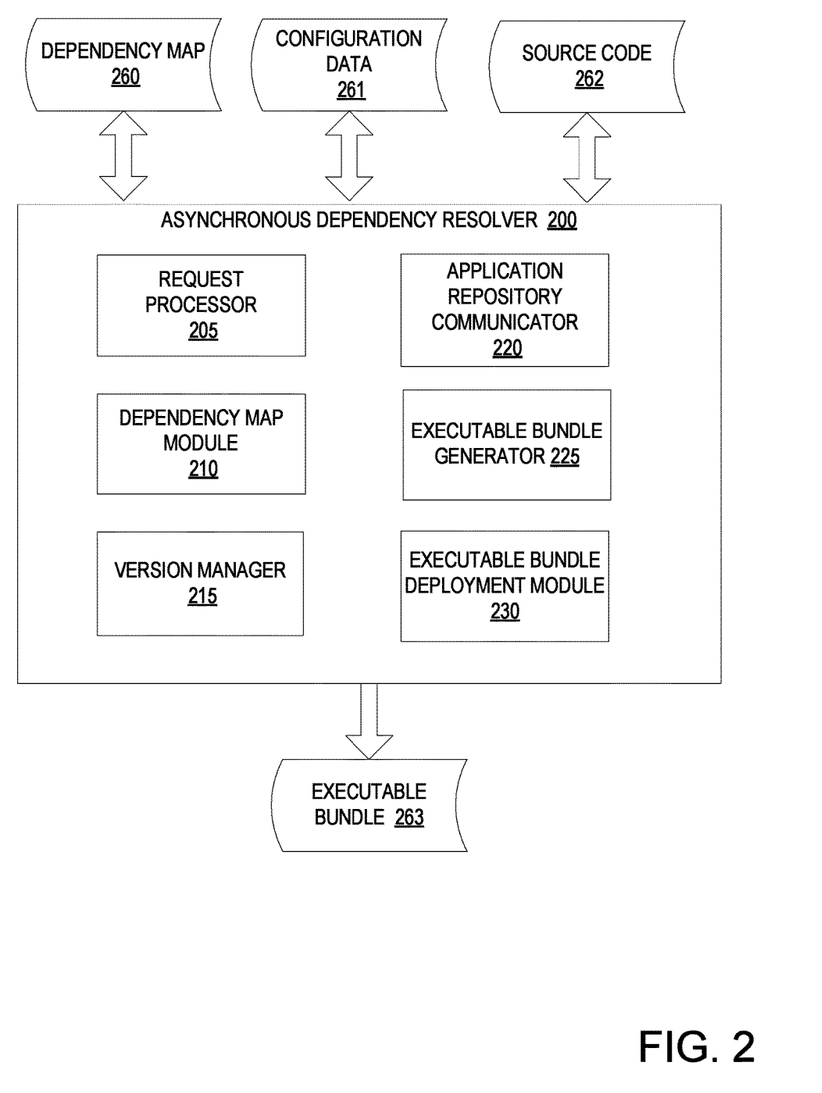
FIG. 2 is a block diagram of a logical view of an asynchronous dependency resolver, in accordance with one embodiment.

FIG. 2 is a block diagram of a logical view of an asynchronous dependency resolver 200, in accordance with one embodiment. In one embodiment, asynchronous dependency resolver 200 may correspond to the asynchronous dependency resolver 115 of FIG. 1. In one embodiment, asynchronous dependency resolver 200 may include request processor 205, dependency map module 210, version manager 215, application repository communicator 220, executable bundle generator 225, and executable bundle deployment module 230.

In one embodiment, asynchronous dependency resolver 200 may facilitate the storing and/or deployment of application components by utilizing stored dependency relationships. In one embodiment, request processor 205 can receive a request from a client device (e.g., device 130 of FIG. 1) to store an application component in an application repository. In one embodiment, the request may include the source code for the application component, a version identifier (e.g., a version number, version letter, or other information that indicates a version of the application component), and a dependency map that includes dependency relationships for the application component. In one embodiment, the request may be received from an application component development framework executing on the client device (e.g., an application programming development platform, an interactive development environment (IDE) platform, etc.).

In one embodiment, request processor 205 may store the dependency map (dependency map 260) in a dependency repository data structure (dependency mapping data 152 of FIG. 1), store the source code (source code 262) in an application repository (application repository 154 of FIG. 1), and the store the version identifier (configuration data 261) in a configuration data store (configuration data 156 of FIG. 1).

In one embodiment, dependency map module 210 may be invoked to determine whether there are any dependency components that are associated with the application component. If so, dependency map module 210 may use the dependency map 260 to identify the dependency components, and invoke application repository communicator 220 to obtain the appropriate source code for the dependency components. In one embodiment, executable bundle generator 225 may then be invoked to generate an executable bundle for the application component using the application component source code so that it may be deployed and/or stored (executable bundle 263). Subsequently, in one embodiment, executable bundle deployment module 230 may be invoked to store executable bundle 263 in a data store, or provide it to a web application that executes in a browser.

In one embodiment, asynchronous dependency resolver 200 may initiate a process to rebuild any application components for which the newly generated application component is a dependency (e.g., consumers of the newly generated application component). In one embodiment, dependency map module 210 may be invoked to traverse the mapping information in the dependency repository associated with the newly generated application component to identify references to any dependent components. In one embodiment, dependency map module 210 may execute a reverse lookup of an index where an identifier associated with the application component is the key. In one embodiment, other methods may be used for other types of data structures to identify the consumer application components.

In one embodiment, upon identifying a second application component that is a consumer of the first application component (e.g., where the first application component is a dependency of the second application component), application repository communicator 220 may then be invoked to obtain the source code for the second application. Executable bundle generator 225 may then be invoked to generate a new executable bundle for the second application component that includes the source code for the second application component as well as the source code for the first application component.

In one embodiment, dependency map module 210 may determine that the first and second application components are each separately associated with a third application component by accessing information in the dependency repository. In other words, dependency map module 210 may determine that the third application component is a dependency of both the first application component and the second application component. In one embodiment, dependency map module 210 may make this determination by obtaining the dependency maps for the first application component and the second application component from the dependency repository and generating an intersection between the two dependency maps to identify any common dependencies in the two dependency maps.

For example, in one embodiment, dependency map module 210 may determine that the dependency map for the first application component includes a reference to the third application component that identifies the third application component as a dependency of the first application component. In one embodiment, dependency map module 210 may determine that the dependency map for the second application component includes a reference to the third application component that identifies the third application component as a dependency of the second application component.

In one embodiment, version manager 215 may then be invoked to determine if the same version of any identified common dependencies may be used when generating an executable bundle. In one embodiment, version manager 215 may receive configuration data (configuration data 261) associated with the first application component that specifies a particular version of the third component to be used when building an executable bundle for the first application component. Similarly, in one embodiment, version manager 215 may receive configuration data associated with the second application component that specifies a particular version of the third component to be used when building an executable bundle for the second application component.

In one embodiment, version manager 215 may optimize the executable bundles by then determining whether a single version of the third application component may be used when generating the combined executable bundle that includes the first, second, third application components. In one embodiment, version manager 215 may make this determination by determining whether the version of the third application component needed for the first application component is compatible with the version needed for the second application component.

In one embodiment, the versions may be considered compatible if the version identifiers in the configuration data for the first and second application components match exactly. For example, if the first application component expects version 1.0 of the third component, and the second application component also expects version 1.0 of the third component, the two may be considered compatible. In one embodiment, versions may be considered compatible if a later version of an application component incorporates and supports features of a previous version (e.g., the later version is backward compatible with the earlier version). For example, if the first application component expects version 1.1 and the second application component can use any version after 1.0, the two may be considered compatible. In one embodiment, the versions may be considered incompatible if the first and second application components each expect different versions of the third component where versions are not backward compatible. For example, if the first application component expects version 1.0 of the third component and the second component expects version 2.0 (a more recently updated version that removes features supported by the earlier version or includes new features unsupported by the earlier version), then the two may be considered incompatible.

In one embodiment, if version manager 215 determines that the versions of the third application component (e.g., the common dependency component) are compatible, executable bundle generator 225 may be invoked to create an executable bundle for the second application component that includes the source code for the first application component, the source code for the second application component and a single copy of the source code for the third application component. In other words, executable bundle generator 225 de-duplicates the code needed for the third application component, thereby optimizing the resulting executable bundle. This is illustrated below with respect to FIG. 3A.

In one embodiment, if version manager 215 determines that the versions of the third application component are not compatible, executable bundle generator 225 may be invoked to create an executable bundle for the second application component using different versions for the third application component where appropriate. For example, in one embodiment, executable bundle generator 225 may generate one executable bundle for the first application component that includes the source code for the first application component as well as the source code for its expected version of the third application component. In one embodiment, executable bundle generator 225 may then generate an executable bundle for the second application component that includes the source code for the second application component as well as the source code for its expected version of the third application component. In one embodiment, rather than generate new executable bundles for either the first application component or the second application component, executable bundle generator 225 may use the source code of an application component to reference a previously generated executable bundle for that web component. In one embodiment, executable bundle generator 225 may then combine the two bundles (either newly generated or previously generated) into a single executable bundle for the second application component. This is illustrated below with respect to FIG. 3B.

In one embodiment, asynchronous dependency resolver 200 may dynamically generate executable bundles for web application components added to a web page using stored dependency relationships in a similar manner to that noted above. In one embodiment, request processor 205 can receive a request from a browser of a client device to dynamically add multiple web components (e.g., application components) to a web page, where the web components are each elements of the web page. For example, in one embodiment, a user that elects to build a dynamic web page using a building tool may select multiple "widgets" to execute when loading a custom web page in a browser. In one embodiment, dependency resolver 200 may then follow a similar process to that noted above to identify any common dependencies among the selected web components to generate an optimized executable bundle for the web page that eliminates duplicate dependencies.

In one embodiment, dependency map module 210 may be invoked to obtain dependency maps for the web components and generate an intersection between the dependency maps to identify any common dependencies that are included in the dependency maps. In one embodiment, dependency map module 210 may use the intersection of the dependency maps to determine that the dependency maps for the web components each include a reference to a common dependency (e.g., a web component that is a dependency of each of the web components added to the web page by the user). For example, two web components that are added to a web page may both have respective dependency maps that reference a third web component.

In one embodiment, version manager 215 may then be invoked to determine if the same version of any identified common dependencies may be used when generating an executable bundle for the web components. In one embodiment, version manager 215 may receive configuration data (configuration data 261) associated with the first web component that specifies a particular version of the third web component to be used when building the executable bundle for the first web component. In one embodiment, version manager 215 may receive configuration data associated with the second web component that specifies a particular version of the third web component to be used when building an executable bundle for the second web component.

In one embodiment, version manager 215 may then determine whether the version of the third web component needed for the first web component is compatible with the version needed for the second web component in a similar manner to that noted above. In one embodiment, if version manager 215 determines that the versions of the third web component (e.g., the common dependency component) are compatible, executable bundle generator 225 may be invoked to create an executable bundle for the web page that includes the source code for the first web component, the source code for the second web component and a single copy of the source code for the third web component. In other words, executable bundle generator 225 de-duplicates the code needed for the third web component, thereby optimizing the resulting executable bundle. This is illustrated below with respect to FIG. 4A. In one embodiment, executable bundle deployment module 230 may then be invoked to deploy the executable bundle to the browser.

In one embodiment, if version manager 215 determines that the versions of the third application component are not compatible, executable bundle generator 225 may be invoked to create an executable bundle for the web page using different versions for the third web component where appropriate. For example, in one embodiment, executable bundle generator 225 may generate one executable bundle for the first web component that includes the source code for the first web component as well as the source code for its expected version of the third web component. In one embodiment, executable bundle generator 225 may then generate an executable bundle for the second web component that includes the source code for the second web component as well as the source code for its expected version of the third web component. In one embodiment, rather than generate new executable bundles for either the first web component or the second web component, executable bundle generator 225 may use the source code of a web component to reference a previously generated executable bundle for that web component. In one embodiment, executable bundle generator 225 may then combine the two bundles (either newly generated or previously generated) into a single executable bundle for the web page. This is illustrated below with respect to FIG. 4B. In one embodiment, executable bundle deployment module 230 may then be invoked to deploy the executable bundle to the browser.

FIGS. 3A-4B illustrate examples of incorporating version control tracking in conjunction with dependency mapping information to resolve dependencies when generating executable bundles for application components.

Figure 3A:
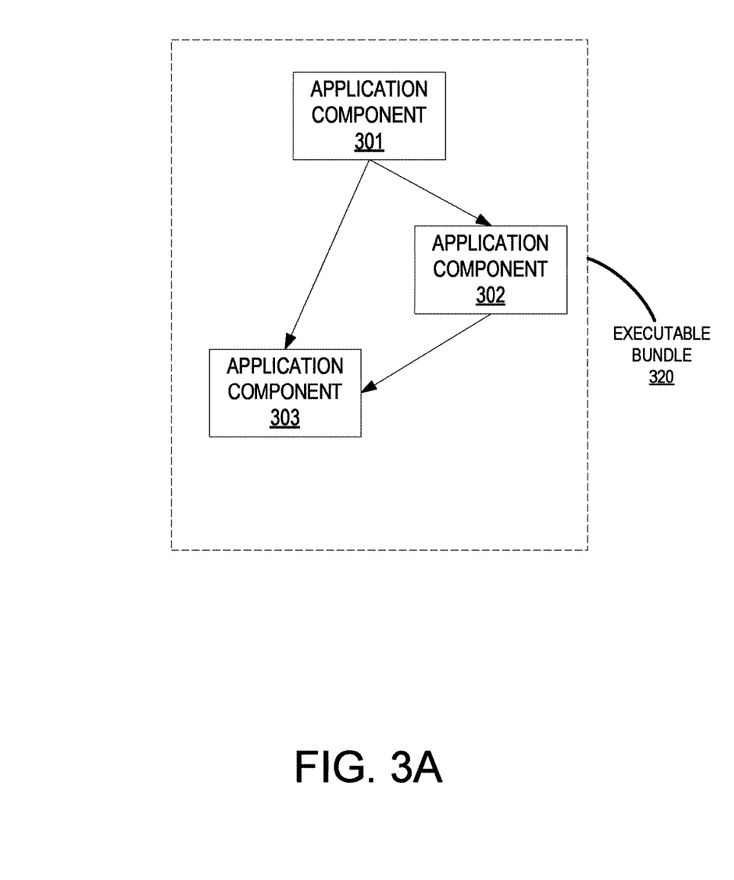
FIG. 3A illustrates an example of a combined dependency map for application components that reference compatible versions of a common dependency, in accordance with one embodiment.

FIG. 3A illustrates a combined dependency map for application components that reference compatible versions of a common dependency in accordance with one embodiment. As shown in FIG. 3A, in one embodiment, application component 301 is a consumer of application component 302 (e.g., application component 302 is a dependency of application component 301). Additionally, the combined dependency map shows that application component 301 and application component 302 both share the common dependency of the same version of application component 303 (as depicted by a single box for application component 303). As described above with respect to FIG. 2, when generating executable bundle 320 for application component 301, a single copy of application component 303 may be used.

Figure 3B:
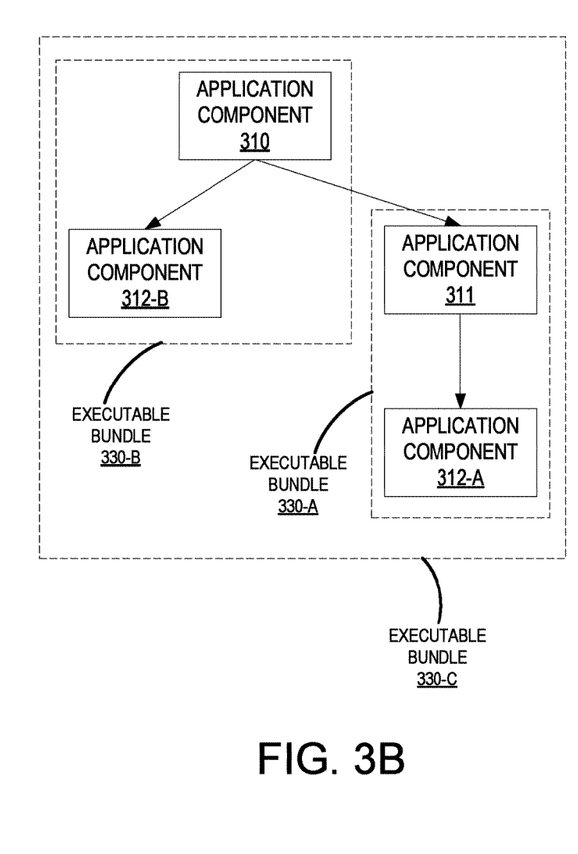
FIG. 3B illustrates an example of a combined dependency map for application components that reference incompatible versions of a common dependency, in accordance with one embodiment.

FIG. 3B illustrates a combined dependency map for application components that reference incompatible versions of a common dependency in accordance with one embodiment. As shown in FIG. 3B, in one embodiment, application component 310 is a consumer of application component 311 (e.g., application component 311 is a dependency of application component 310). Additionally, the combined dependency map shows that application component 310 and application component 311 both share the common dependency of application component 312. However, in contrast to FIG. 3A, application component 310 expects version B of application component 312 (as depicted by application component 312-B), and application component 311 expects version A of application component 312 (as depicted by application component 312-A). As described above with respect to FIG. 2, when generating executable bundle 330-C for application component 310, both versions of application component 312 should be used. As shown in FIG. 3B, executable bundle 330-A can be generated for application component 311 that includes application component 312-A and executable bundle 330-B can be generated for application component 310 that includes application component 312-B. Executable bundles 330-A and 330-B may then be combined to generate bundle 330-C for deployment and/or storage.

Figure 4A:
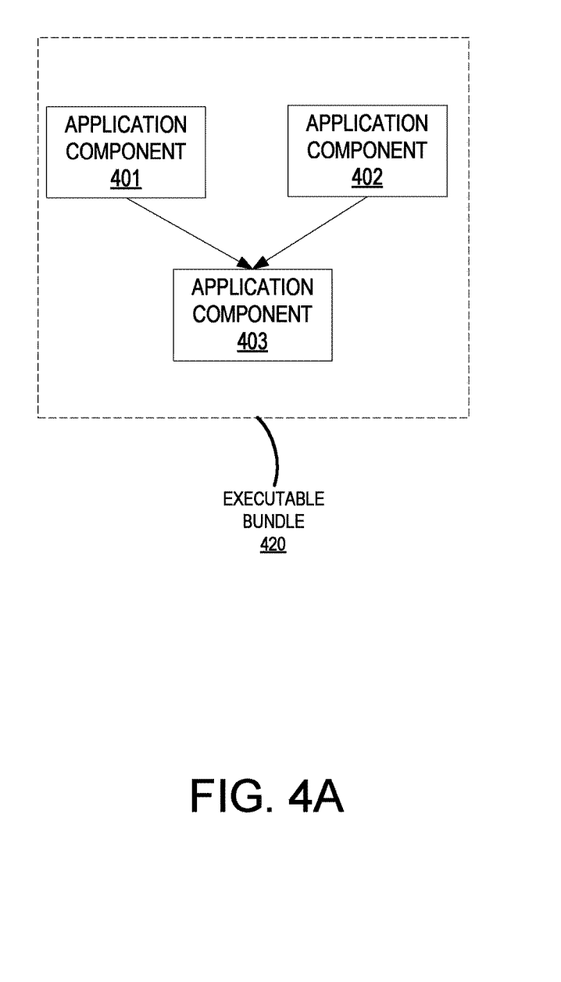
FIG. 4A illustrates an example of a combined dependency map for web components that reference compatible versions of a common dependency, in accordance with one embodiment.

FIG. 4A illustrates a combined dependency map for web components that reference compatible versions of a common dependency in accordance with one embodiment. As shown in FIG. 4A, in one embodiment, application component 401 and application component 402 are both consumers of application component 403 (e.g., application component 403 is a dependency of both application components 401 and 402). Additionally, the combined dependency map shows that application component 401 and application component 402 both share the common dependency of the same version of application component 403 (as depicted by a single box for application component 403). As described above with respect to FIG. 2, when generating executable bundle 420 for a web page that includes application components 401 and 402, a single copy of application component 403 may be used.

Figure 4B:
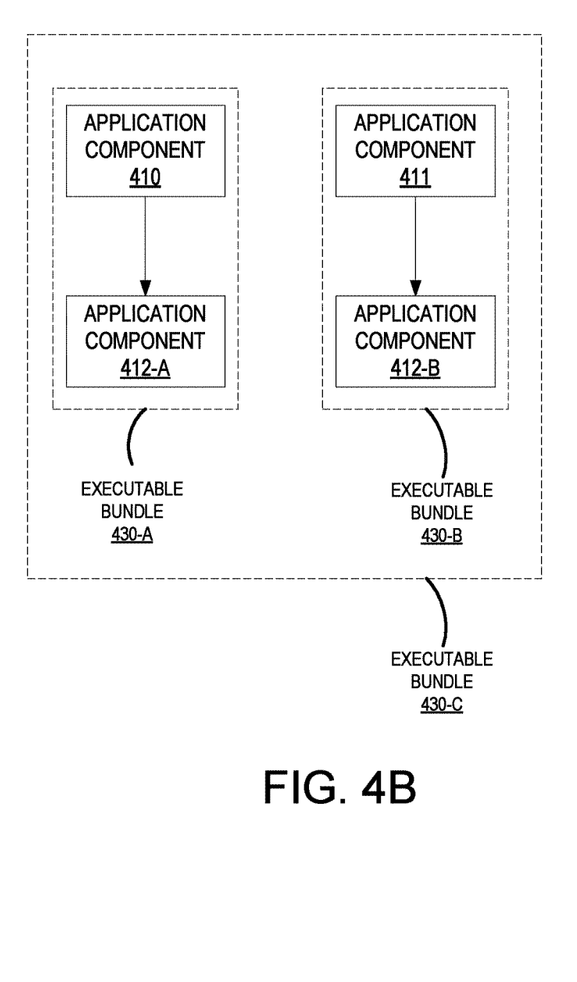
FIG. 4B illustrates an example of a combined dependency map for web components that reference incompatible versions of a common dependency, in accordance with one embodiment.

FIG. 4B illustrates a combined dependency map for web components that reference incompatible versions of a common dependency in accordance with one embodiment. As shown in FIG. 4B, in one embodiment, the combined dependency map shows that application component 410 and application component 411 both share the common dependency of application component 412. However, in contrast to FIG. 4A, application component 410 expects version A of application component 412 (as depicted by application component 412-A), and application component 411 expects version B of application component 412 (as depicted by application component 412-B). As described above with respect to FIG. 2, when generating executable bundle 430-C for a web page, both versions of application component 412 should be used. As shown in FIG. 4B, executable bundle 430-A can be generated for application component 410 that includes application component 412-A and executable bundle 430-B can be generated for application component 411 that includes application component 412-B. Executable bundles 430-A and 430-B may then be combined to generate bundle 430-C for deployment to a browser that loads the web page.

Figure 5:
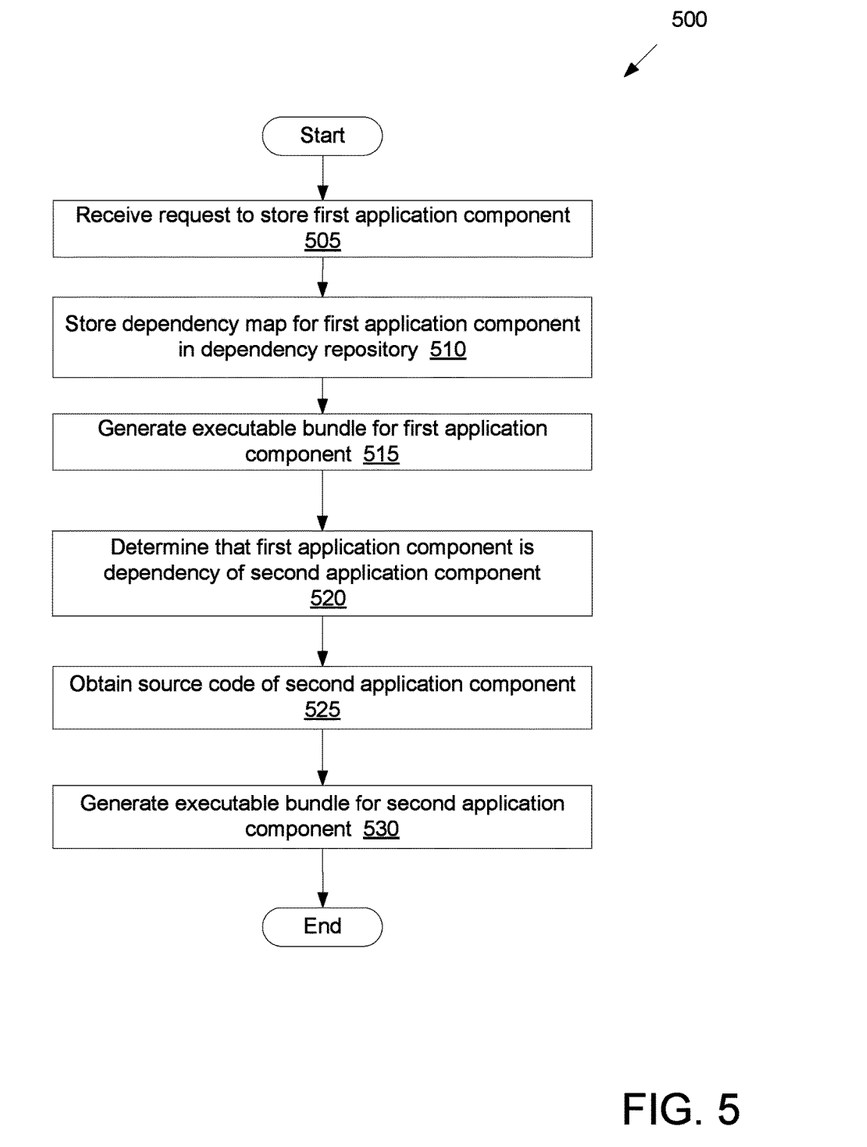
FIG. 5 is a flow diagram of an embodiment for a method of resolving dependency relationships of when storing an application component.
Figure 6:
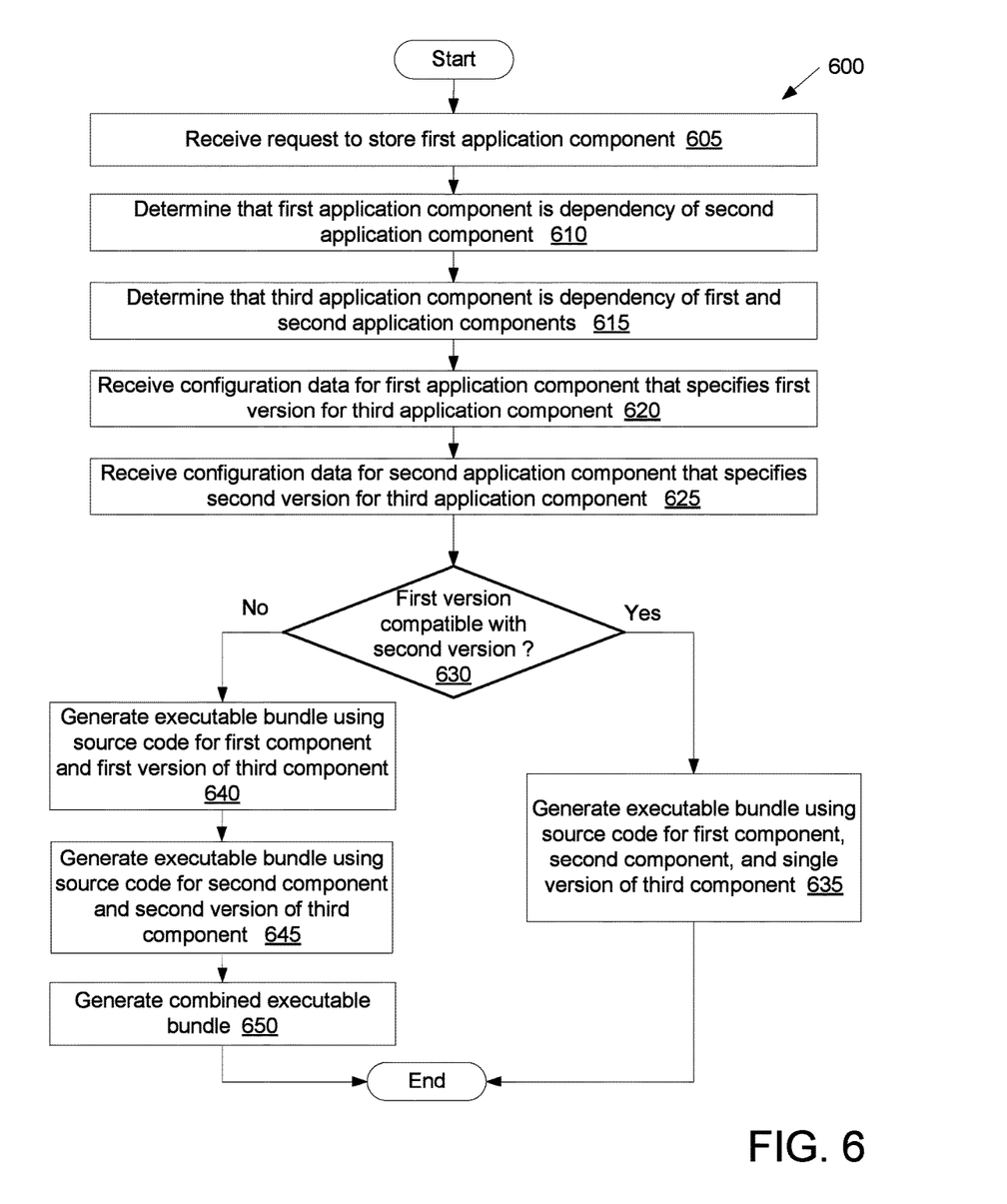
FIG. 6 is a flow diagram of an embodiment for a method of resolving dependency relationships for stored components using version tracking.
Figure 7:
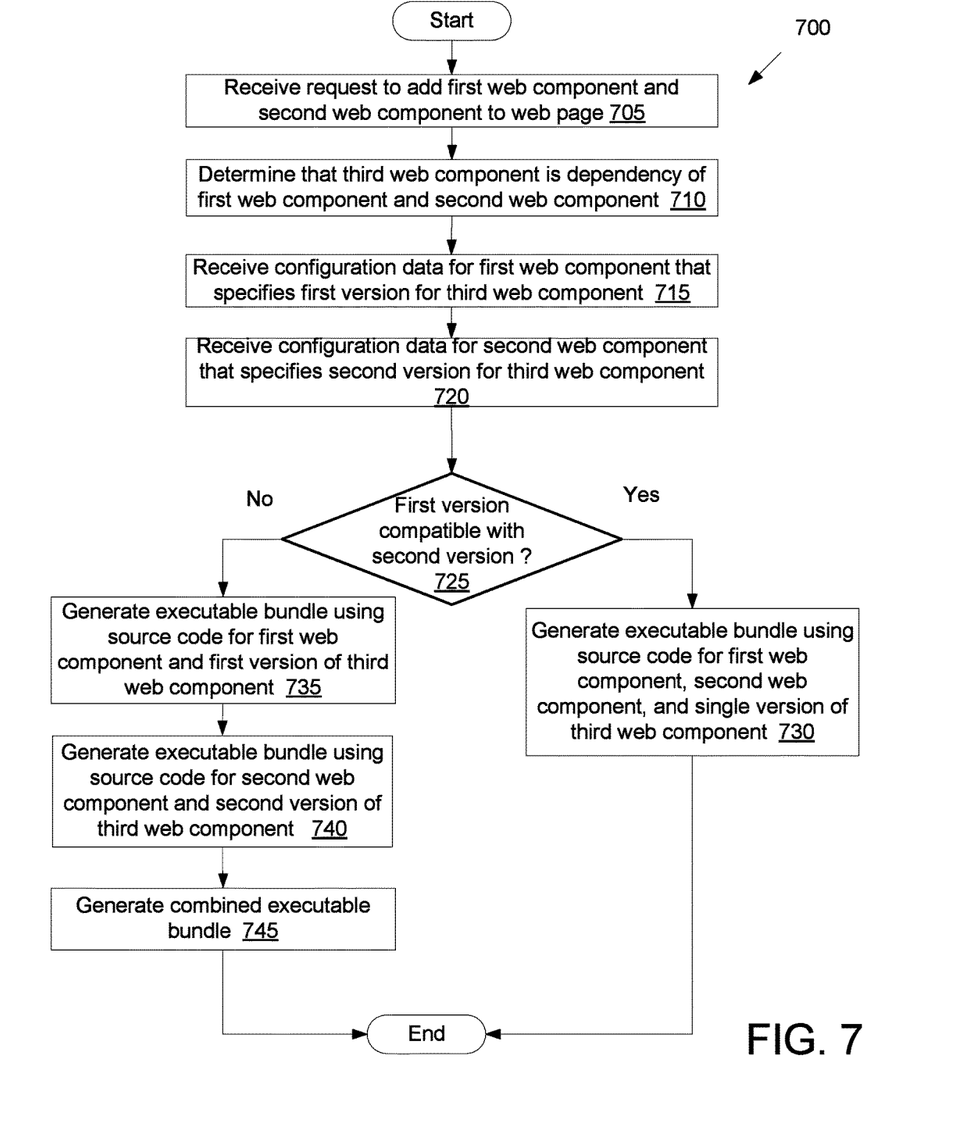
FIG. 7 is a flow diagram of an embodiment for a method of resolving dependency relationships using version tracking for web components added to a web page.

FIGS. 5-7 are flow diagrams of various embodiments of methods performed by a asynchronous dependency resolver to resolve application dependencies. The methods are performed by processing logic that may include hardware (circuitry, dedicated logic, etc.), software (such as is run on a general purpose computer system or a dedicated machine), firmware, or some combination thereof. In one embodiment, the methods may be performed by asynchronous dependency resolver 115 of FIG. 1, and/or asynchronous dependency resolver 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 5 is a flow diagram of an embodiment for a method 500 of resolving dependency relationships of when storing an application component. At block 505 of method 500, processing logic receives a request to store a first application component in an application repository. In one embodiment, request may be received when a new application component is being added to the repository. In one embodiment, the request may be received when an update to an existing application is being stored. In one embodiment, the request may include the source code for the first application component, a version number for the first application component, and a dependency map for the first application component that includes dependency relationships for the first application component.

At block 510, processing logic stores the dependency map for the first application component in a dependency repository. In one embodiment, the dependency repository may be a data structure that is capable of storing and managing the dependency maps for any application component in the system. At block 515, processing logic generates an executable bundle for the first application component using the source code for the first application component.

At block 520, processing logic determines the first application component is a dependency of a second application component. In one embodiment, processing logic may make this determination by determining that the dependency repository includes an association between the first application component and the second application component that indicates that the first application component is a dependency of the second application component.

At block 525, processing logic obtains the source code of the second application component. At block 530 processing logic generates an executable bundle for the second application using the source code for the first application and the source code for the second application. After block 530, the method of FIG. 5 terminates.

FIG. 6 is a flow diagram of an embodiment for a method 600 of resolving dependency relationships for stored components using version tracking. At block 605 of method 600, processing logic receives a request to store a first application component. In one embodiment, the request may be received when a new application component is being added to the repository. In one embodiment, the request may be received when an update to an existing application is being stored. In one embodiment, the request may include the source code for the first application component, a version number for the first application component, and a dependency map for the first application component that includes dependency relationships for the first application component.

At block 610, processing logic determines the first application component is a dependency of a second application component. In one embodiment, processing logic may make this determination by determining that information stored in a dependency repository includes an association between the first application component and the second application component that indicates that the first application component is a dependency of the second application component.

At block 615, processing logic determines that a third application component is a dependency of both the first application component and the second application component. In one embodiment, processing logic may make this determination by obtaining dependency maps for the first and second application component from the dependency repository, and generating an intersection using the two dependency maps to identify common dependencies included in the two dependency maps.

At block 620, processing logic receives configuration data for the first application component that specifies a first version for the third application component. At block 625, processing logic receives configuration data for the second application component that specifies a second version for the third application component.

At block 630, processing logic branches based on whether the first version of the third application component is compatible with the second version of the third application component. In one embodiment, the versions may be considered compatible if the version identifiers in the configuration data for the first and second application components match exactly. In one embodiment, the versions may be considered compatible if a later version of the third application component incorporates and supports features of a previous version (e.g., the later version is backward compatible with the earlier version). In one embodiment, the versions may be considered incompatible if the first and second application components each expect different versions of the third component where versions are not backward compatible.

If at block 630 processing logic determines that the first version is compatible with the second version, processing continues to block 635. At block 635, processing logic generates an executable bundle for the second application component using the source code from the first application component, the second application component, and a single version of the third application component. After block 635, the method of FIG. 6 terminates If at block 630 processing logic determines that the first version is not compatible with the second version, processing continues to block 640. At block 640, in one embodiment, processing logic generates an executable bundle for the first application component using the source code for the first application component and the source code for the first version of the third application component. In one embodiment, rather than generate a new executable bundle for the first application component, processing logic can use the source code to reference a previously generated executable bundle for the first application component. At block 645, in one embodiment, processing logic generates an executable bundle for the second application component using the source code for the second application component and the source code for the second version of the third application component. In one embodiment, rather than generate a new executable bundle for the second application component, processing logic can use the source code to reference a previously generated executable bundle for the second application component. At block 650, processing logic generates a combined executable bundle using the two sub-bundles created at blocks 640 and 645. In one embodiment, if at either of blocks 640 or 645 a reference to a previously generated executable bundle was used, processing logic at block 650 may generate the combined executable bundle for the using the corresponding previously generated executable sub-bundle. After block 650, the method of FIG. 6 terminates.

FIG. 7 is a flow diagram of an embodiment for a method 700 of resolving dependency relationships using version tracking for web components added to a web page. At block 705 of method 700, processing logic receives a request to add a first web component and a second web component to a web page. In one embodiment, request may be received from a browser of a client device to dynamically add multiple web components (e.g., application components) to a web page, where the web components are each elements of the web page.

At block 710, processing logic determines that a third web component is a dependency of both the first web component and the second web component. In one embodiment, processing logic may make this determination by obtaining dependency maps for the first and second web components from a dependency repository, and generating an intersection using the two dependency maps to identify common dependencies included in the two dependency maps.

At block 715, processing logic receives configuration data for the first web component that specifies a first version for the third web component. At block 720, processing logic receives configuration data for the second web component that specifies a second version for the third web component.

At block 725, processing logic branches based on whether the first version of the third web component is compatible with the second version of the third web component. In one embodiment, the versions may be considered compatible if the version identifiers in the configuration data for the first and second web components match exactly. In one embodiment, the versions may be considered compatible if a later version of the third web component incorporates and supports features of a previous version (e.g., the later version is backward compatible with the earlier version). In one embodiment, the versions may be considered incompatible if the first and second web components each expect different versions of the third web where versions are not backward compatible.

If at block 725 processing logic determines that the first version is compatible with the second version, processing continues to block 730. At block 730, processing logic generates an executable bundle for the web page using the source code from the first web component, the second web component, and a single version of the third web component. After block 635, the method of FIG. 7 terminates If at block 725 processing logic determines that the first version is not compatible with the second version, processing continues to block 735. At block 735, in one embodiment, processing logic generates an executable bundle for the first web component using the source code for the first web component and the source code for the first version of the third web component. In one embodiment, rather than generate a new executable bundle for the first web component, processing logic can use the source code to reference a previously generated executable bundle for the first web component. At block 740, in one embodiment, processing logic generates an executable bundle for the second web component using the source code for the second web component and the source code for the second version of the third web component. In one embodiment, rather than generate a new executable bundle for the second web component, processing logic can use the source code to reference a previously generated executable bundle for the second web component. At block 745, processing logic generates a combined executable bundle for the web page using the two sub-bundles created at blocks 735 and 740. In one embodiment, if at either of blocks 735 or 740 a reference to a previously generated executable bundle was used, processing logic at block 745 may generate the combined executable bundle for the web page using the corresponding previously generated executable sub-bundle. After block 740, the method of FIG. 7 terminates.

Figure 8:
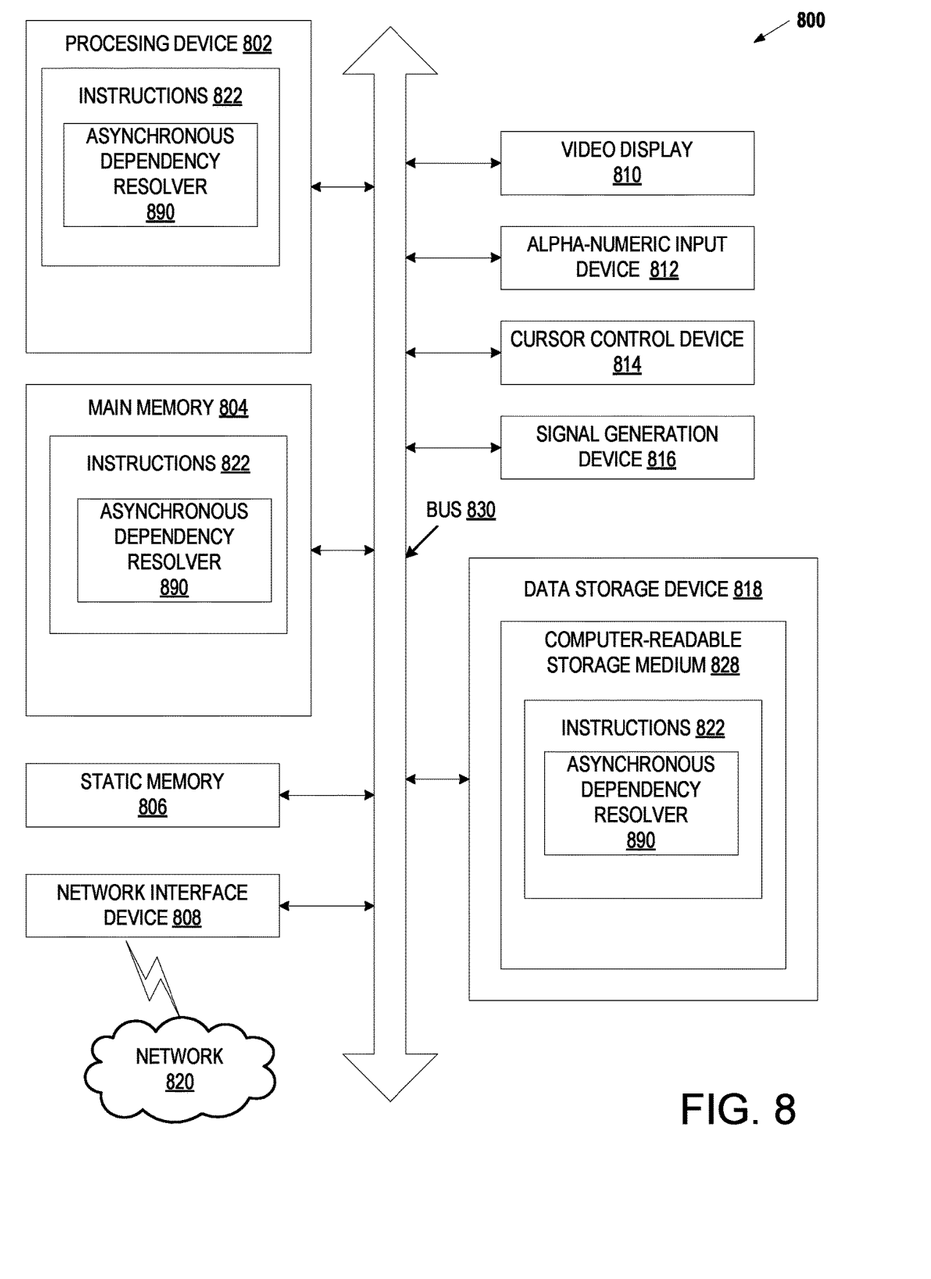
FIG. 8 is a block diagram illustrating a server computing device with an asynchronous dependency resolver, in accordance with one embodiment.

FIG. 8 is a block diagram illustrating a computing device 800 with an asynchronous dependency resolver 890, in accordance with one embodiment. In one embodiment, the server computing device 800 may be connected (e.g., networked) to other machines in a LAN, an intranet, an extranet, and/or the Internet. In one embodiment, the server computing device 800 may be a personal computer (PC), a tablet PC, a set-top box (STB), a web appliance, a rack-mount server, a network router, a switch or bridge, or any machine capable of executing a set of instructions (sequential or otherwise) that specify actions to be taken by that machine. Further, while a single machine is illustrated, in one embodiment the server computing device 800 shall also be taken to include any collection of machines that individually or jointly execute a set (or multiple sets) of instructions to perform any one or more of the methodologies discussed herein. For example, the server computing device 800 may be one or more devices in a server system. In one embodiment, the server computing device 800 is one node of a cluster that provides a cloud service such as Amazon's® elastic compute cloud (EC2®), Amazon web services (AWS®), or other cloud service.

In one embodiment, the server computing device 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage component 818, which communicate with each other via a bus 830.

In one embodiment, processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. In one embodiment, processing device 802 may also be one or more special-purpose processing devices such as an application specific integrated circuit (ASIC), a field programmable gate array (FPGA), a digital signal processor (DSP), network processor, or the like. In one embodiment, the processing device 802 is configured to execute instructions 822 for performing the operations and steps discussed herein.

In one embodiment, the server computing device 800 may further include a network interface device 808. In one embodiment, the server computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and/or a signal generation device 816 (e.g., a speaker).

In one embodiment, the data storage component 818 may include a machine-readable storage medium 828 (also known as a computer-readable medium) on which is stored one or more sets of instructions or software 822 embodying any one or more of the methodologies or functions described herein. In one embodiment, the instructions 822 may also reside, completely or at least partially, within the main memory 804 and/or within the processing device 802 during execution thereof by the server computing device 800, the main memory 804 and the processing device 802 also constituting machine-readable storage media.

In one embodiment, the instructions 822 include instructions for an asynchronous dependency resolver 890 (e.g., asynchronous dependency resolver 115 of FIG. 1, and/or asynchronous dependency resolver 200 of FIG. 2) and/or a software library containing methods that call modules in an contact run-time engine (e.g., corresponding to the methods of FIGS. 5-7, etc.). In one embodiment, while the machine-readable storage medium 828 is shown to be a single medium, the term "machine-readable storage medium" should be taken to include a single medium or multiple media (e.g., network attached storage, a centralized or distributed database, and/or associated unsolicited content storage areas and servers) that store the one or more sets of instructions. In one embodiment, the term "machine-readable storage medium" shall also be taken to include any medium other than a carrier wave that is capable of storing or encoding a set of instructions for execution by the machine and that cause the machine to perform any one or more of the methodologies of the present disclosure. In one embodiment, the term "machine-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "generating", "determining", "obtaining", "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention relate to an apparatus for performing the operations herein. This apparatus may be specially constructed for the disclosed purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The structure for a variety of these systems will appear from the description above. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a request from a browser of a client device to add a first web component and a second web component to a web page, wherein the first web component and the second web component comprise elements of the web page;
   obtaining a first dependency map comprising dependency relationships for the first web component and a second dependency map comprising dependency relationships for the second web component;
   generating an intersection between the first dependency map and the second dependency map to identify at least one common dependency in the first dependency map and the second dependency map;
   determining, using the intersection, that the first dependency map comprises a first reference to a third web component, wherein the third web component is a dependency of the first web component;
   determining, using the intersection, that the second dependency map comprises a second reference to the third web component, wherein the third web component is a dependency of the second web component;
   obtaining a first source code of the first web component, a second source code of the second web component, and a third source code of the third web component;
   generating a first executable bundle for the web page, the executable bundle comprising the first source code, the second source code, and the third source code;
   determining whether a first version of the third web components compatible with a second version of the third web component; and
   deploying the first executable bundle to the browser of the client device.

2. The method of claim 1, further comprising:
   receiving a first configuration data for the first web component, wherein the first configuration data specifies the first version for the third web component; and
   receiving a second configuration data for the first web component, wherein the second configuration data specifies the second version for the third web component.

3. The method of claim 1 further comprising:
   responsive to determining that the first version is compatible with the second version, generating the first executable bundle using the first source code, the second source code, and a single copy of the third source code, wherein the single copy of the third source code is associated with the first version or the second version.

4. The method of claim 1 further comprising:
   responsive to determining that the first version is not compatible with the second version:
      generating a second executable bundle using the first source code and the first version of the third source code;
      generating a third executable bundle using the second source code and the second version of the third source code; and
      generating the first executable bundle using the second executable bundle and the third executable bundle.

5. A system comprising:
   a processing device; and
   memory to store computer-executable instructions that, if executed, cause the processing device to:
   receive a request to add a first web component and a second web component to a web page, wherein the first web component and the second web component comprise elements of the web page;
   obtain, from a dependency repository, dependency information comprising a first dependency map comprising dependency relationships for the first web component and a second dependency map comprising dependency relationships for the second web component;

determine, using the dependency information, that a third web component is a common dependency of the first web component and the second web component;

obtain a first source code of the first web component, a second source code of the second web component, and a third source code of the third web component;

generate a first executable bundle for the web page, the executable bundle comprising the first source code, the second source code, and the third source code;

determine whether a first version of the third web component is compatible with a second version of the third web component; and deploy the first executable bundle to a browser.

6. The system of claim 5, wherein the processing device is further to:

generate an intersection between the first dependency map and the second dependency map to identify at least one common dependency in the first dependency map and the second dependency map; and determine that the intersection comprises a reference to the third component.

7. The system of claim 6, wherein the processing device is further to:

determine, using the intersection, that the first dependency map comprises a first reference to the third web component, wherein the third web component is a dependency of the first component; and determine, using the intersection, that the second dependency map comprises a second reference to the third web component, wherein the third web component is a dependency of the second component.

8. The system of claim 6, wherein the processing device is further to:

receive a first configuration data for the first web component, wherein the first configuration data specifies the first version for the third web component; and receive a second configuration data for the first web component, wherein the second configuration data specifies the second version for the third web component.

9. The system of claim 8, wherein to determine that the first version is compatible with the second version, the processing device is to determine that the first version is equal to the second version.

10. The system of claim 8, wherein the processing device is further to:

responsive to determining that the first version is compatible with the second version, generate the first executable bundle using the first source code, the second source code, and a single copy of the third source code, wherein the single copy of the third source code is associated with the first version or the second version.

11. The system of claim 8, wherein to determine that the first version is not compatible with the second version, the processing device is to determine that the first version is not equal to the second version.

12. The system of claim 8, wherein responsive to determining that the first version is not compatible with the second version, the processing device is to:

generate a second executable bundle using the first source code and the first version of the third source code;

generate a third executable bundle using the second source code and the second version of the third source code; and generate the first executable bundle using the second executable bundle and the third executable bundle.

* * * * *